UNITED STATES PATENT OFFICE.

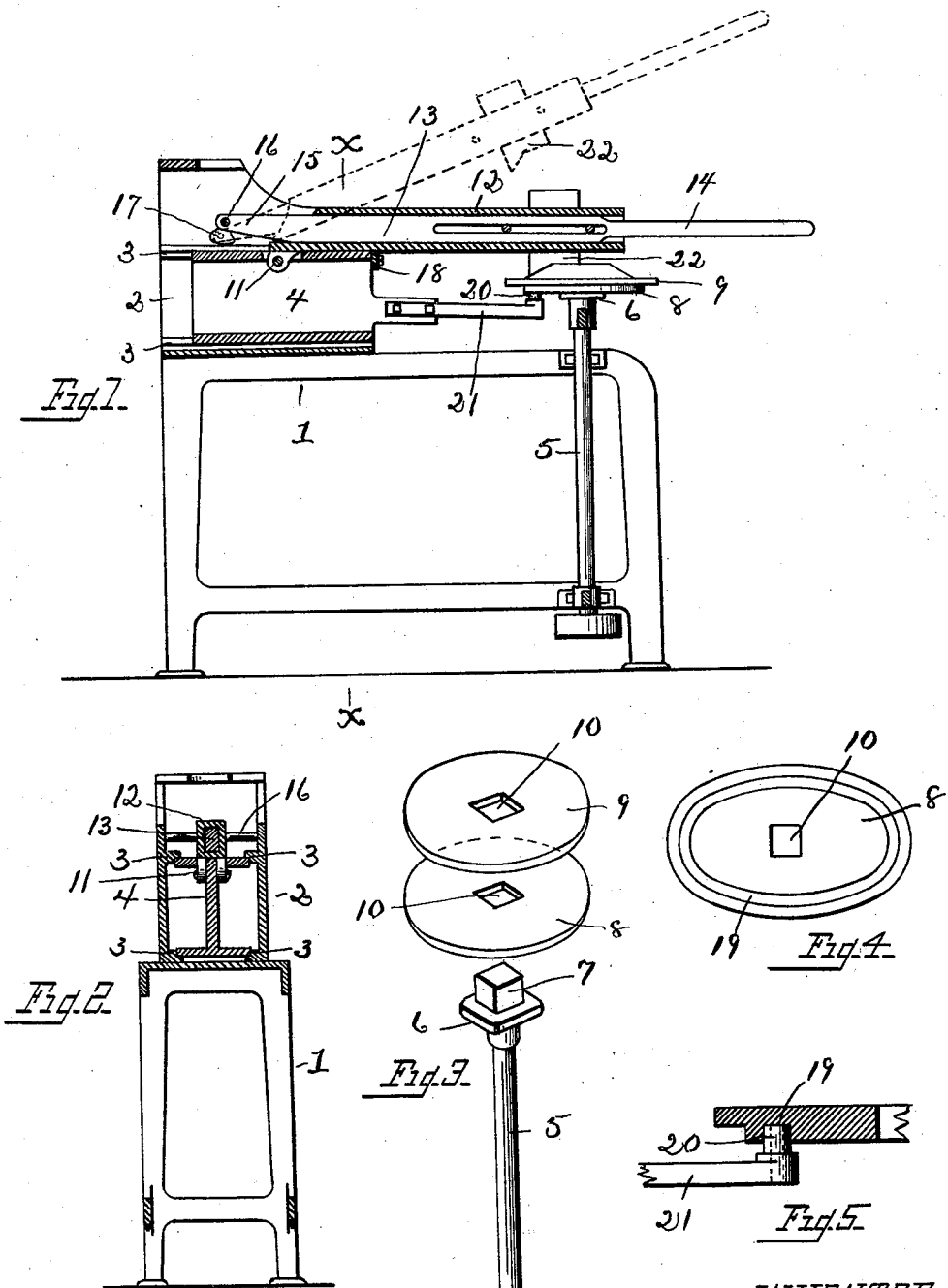

WILLIAM G. JACKSON, OF FINDLAY, OHIO, ASSIGNOR OF ONE-HALF TO EDWIN F. BELL AND WILLIAM M. BELL, OF SAME PLACE.

APPARATUS FOR FORMING SURFACES UPON ARTICLES HAVING IRREGULAR CONTOURS.

SPECIFICATION forming part of Letters Patent No. 537,206, dated April 9, 1895.

Application filed May 2, 1894. Serial No. 509,738. (No model.)

*To all whom it may concern:*

Be it known that I, WILLIAM G. JACKSON, of Findlay, county of Hancock, and State of Ohio, have invented certain new and useful Improvements in Apparatus for Forming Surfaces Upon Articles Having Irregular Contours; and I do hereby declare that the following is a full, clear, and exact description of the invention, which will enable others skilled in the art to which it appertains to make and use the same, reference being had to the accompanying drawings, and to the numerals of reference marked thereon, which form part of this specification.

My invention relates to an apparatus for forming surfaces upon articles having an irregular contour, and the object of the invention is to provide a machine for mechanically producing this result.

The invention consists in a revoluble holder upon which the article is formed, and a longitudinal movable tool for forming the article, which has a longitudinal movement corresponding to the contour of the article to be formed.

The invention further consists in the parts as shown in the drawings, described in the specification and pointed out in the claim.

Figure 1 is an elevation partly in section, of a device constructed in accordance with my invention. Fig. 2 is a sectional elevation of the same on lines x—x, Fig. 1. Fig. 3 is a detail view of the revoluble shaft and head, upon which the former and holder for the articles are placed, showing the former and holder removed therefrom. Fig. 4 is a bottom plan view of the holder, showing an oval groove to be used in making surfaces upon ware having an oval contour. Fig. 5 is a detail sectional view of the former, illustrating the groove and anti-friction roller in co-action therewith.

I have illustrated the device as applied to a machine for making pottery, such as platters, &c., but I wish it understood that it is equally well adaptable for any kind of work where it is desired to form surfaces upon articles having irregular contour.

1 designates the frame, upon which is supported a guide 2, having ways 3, in which slides a carrier 4.

In the frame is journaled a shaft 5, driven by any suitable motive power, and upon the upper end of said shaft is secured plate 6, having an upwardly extending head 7, preferably square in cross section, upon which fits the former 8 and the plate 9, upon which the mold or any suitable mechanism for holding the article upon which the surface is to be formed, is placed. Therefore the former and the plate 9 are provided with opening 10, corresponding in size and shape to the head 7, the former and plate being preferably held thereon by their own weight.

Pivotally secured to the carrier 4, at 11, is a tool holder 12 having a central opening through which passes a handle 13, the outer end 14 of which is grasped by the operator, the inner end 15 having a pin 16 passed therethrough, the ends of which are seated in an opening 17, in the guide. Said opening being substantially triangular, allows pin 16 to seat in the upper end thereof when the handle is lowered, thereby preventing the longitudinal movement of the handle, and when the handle is raised, the pin sliding into the enlarged portion of the opening, will have a longitudinal movement, the purpose of which will be described hereinafter.

18 is a bar secured to the guide 2, upon which the holder rests when in operative position.

Former 8 is provided with a groove 19, preferably upon the lower side thereof, said groove being of a contour corresponding to the contour of the article being operated upon, and riding in the groove is an anti-friction roller 20, upon an arm 21, which is secured to the carrier 4.

22 designates the tool, which may be of any description, there being no claim laid thereto.

In operation, it being desired to form a surface upon an article, a former having a contour similar to the contour of the article to be formed, is placed upon the head. The handle 14 being previously raised, plate 9 is secured thereon, and the article to be formed is placed upon the plate, which in the manufacture of pottery would consist in a mold having the shape of the upper surface of the article formed, which is covered with unmolded clay. Shaft 5 is now revolved, which revolves the former, which by reason of the co-action of the anti-friction roller 20 therewith, causes the carrier 4 to move back and forth equal the distance of the irregularity of the contour of the former. Tool holder 12 moving therewith, will cause the tool to move backward and forward a corresponding distance, and as the tool is placed in a vertical line with the former, the tool must consequently form a surface upon the article, making the contour of the same similar to that described by the groove in the former.

As the shaft 5 has a continuous rotation during the operation of forming the ware, and as the handle 14 has to be raised to deposit and remove the articles from the holder, it is necessary that the handle as it is raised from a horizontal, should be allowed to move with the tool holder. Therefore I have provided a triangular shaped slot 17 as heretofore described, as it will be obvious that some means must be employed to allow movement of the arm as it is removed from a parallel relation to the movement of the tool holder.

It will be evident that while I have shown a tool 22 for the purpose of forming an article out of plastic material, I may change the character of the tool to adapt itself to any kind of work, without departing from the spirit of my invention, the invention broadly consisting in a longitudinal movable tool and a guide having a contour of the article to be formed actuating the same.

It will also be evident that other means may be employed to move the carrier; as for instance using a groove 19, I may form the periphery of the former of the desired contour, and allow the anti-friction roller 20 to rest against the same under spring pressure, the operation being the same.

What I claim is—

In an apparatus for forming surfaces upon articles having an irregular contour, a revoluble shaft, a former and holder for the article to be formed revolved thereby, a frame, a slide moved by the former, a tool holder pivotally connected with the slide, a handle pivotally connected with the frame and passing through the tool holder, and means whereby when the handle is lowered, it is stationary with the frame, and when it is raised from a horizontal position, moves with the tool holder.

In testimony that I claim the foregoing as my own I hereby affix my signature in presence of two witnesses.

WILLIAM G. JACKSON.

Witnesses:
GEO. H. PHELPS,
W. M. BELL.